US012380792B2

(12) United States Patent
Al-Rasheed et al.

(10) Patent No.: US 12,380,792 B2
(45) Date of Patent: Aug. 5, 2025

(54) REAL-TIME WORKER LOCATION TRACKING SYSTEM

(71) Applicant: Saudi Arabian Oil Company, Dhahran (SA)

(72) Inventors: Hussain Al-Rasheed, Dhahran (SA); Rosa Mohammed Rubui, Khobar (SA); Abdullah Shaikh, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 59 days.

(21) Appl. No.: 18/404,448

(22) Filed: Jan. 4, 2024

(65) Prior Publication Data

US 2025/0225854 A1 Jul. 10, 2025

(51) Int. Cl.
*G08B 25/00* (2006.01)
*G08B 21/18* (2006.01)

(52) U.S. Cl.
CPC .................................... *G08B 21/18* (2013.01)

(58) Field of Classification Search
USPC ..... 340/686.1, 686.6, 693.3, 3.1, 3.21, 3.55, 340/5.22, 5.63, 5.64, 825.49, 10.52, 340/309.16, 331, 384.71
See application file for complete search history.

(56) References Cited

U.S. PATENT DOCUMENTS

| | | | | |
|---|---|---|---|---|
| 4,894,662 A | * | 1/1990 | Counselman | G01S 19/37 342/450 |
| 5,587,715 A | * | 12/1996 | Lewis | G01S 19/36 342/357.44 |
| 5,987,979 A | * | 11/1999 | Bryan | E01B 35/06 73/146 |

(Continued)

FOREIGN PATENT DOCUMENTS

| | | |
|---|---|---|
| CN | 106557910 A | 4/2017 |
| CN | 111812610 A | 10/2020 |

(Continued)

OTHER PUBLICATIONS

BeaconTrax; "People Tracking in Oil & Gas Industry" available as of Oct. 9, 2023 at: https://www.beacontrax.com/people-tracking-in-oil-gas-industry/; pp. 1-4.

(Continued)

*Primary Examiner* — Daniel Previl
(74) *Attorney, Agent, or Firm* — Bracewell LLP; Constance G. Rhebergen; Brian H. Tompkins

(57) ABSTRACT

The real-time location tracking of workers on a transportation vehicle using a wearable sensor and wireless stations. Embarkment of workers on the transportation vehicle may include capturing an image of an identification document and performing optical character recognition on the document. The embarkment of workers may also include scanning a worker's wearable sensor using a sensor reader and capturing an image of the face of the worker using a camera (Continued)

on the transportation vehicle. The communication between the wearable sensor and wireless stations may be monitored, and the absence of communication over at time period used to indicate a missing worker.

20 Claims, 4 Drawing Sheets

(56) References Cited

U.S. PATENT DOCUMENTS

| | | | | |
|---|---|---|---|---|
| 6,078,290 | A * | 6/2000 | McBurney | G01S 19/09 |
| | | | | 342/417 |
| 6,125,325 | A * | 9/2000 | Kohli | G01S 19/34 |
| | | | | 342/357.33 |
| 6,278,403 | B1 * | 8/2001 | Peng | G01S 19/37 |
| | | | | 342/357.77 |
| 6,389,291 | B1 * | 5/2002 | Pande | G01S 19/09 |
| | | | | 455/521 |
| 7,880,767 | B2 | 2/2011 | Chinigo | |
| 8,514,069 | B2 | 8/2013 | Hadsall, Sr. | |
| 10,127,796 | B2 | 11/2018 | Thurlow et al. | |
| 2011/0084825 | A1 | 4/2011 | John | |
| 2011/0140913 | A1 | 6/2011 | Montenero | |
| 2011/0163896 | A1 * | 7/2011 | Chinigo | G07C 5/0891 |
| | | | | 340/945 |
| 2021/0174952 | A1 | 6/2021 | Leong et al. | |

FOREIGN PATENT DOCUMENTS

| | | |
|---|---|---|
| CN | 218276092 U | 1/2023 |
| IN | 202111007878 | 5/2021 |
| KR | 100886847 B1 | 3/2009 |
| KR | 20130125977 A | 11/2013 |
| KR | 20160012535 A | 2/2016 |
| KR | 101797231 B1 | 11/2017 |
| KR | 102455031 B1 | 10/2022 |
| KR | 20230103081 A | 7/2023 |
| KR | 20230129139 A | 9/2023 |
| KR | 20230129141 A | 9/2023 |
| WO | 2019212795 A1 | 11/2019 |

OTHER PUBLICATIONS

Blueiot; "Accurate Real-Time Location Services for Transportation" available as of Oct. 9, 2023 at: https://www.blueiot.com/rtls-transportation/; pp. 1-5.

Honeywell; "Improve Worker Safety, Protect Your Personnel" Honeywell Safety Watch, Honeywell International Inc., 2022; pp. 1-8.

* cited by examiner

REAL-TIME WORKER LOCATION TRACKING SYSTEM

BACKGROUND

Field of the Disclosure

The present disclosure generally relates to the transportation of workers in boats, ships, and other vehicles. More specifically, embodiments of the disclosure relate to monitoring the safety and tracking the location of workers during transportation.

Description of the Related Art

Many industries use offshore facilities for different operations. For example, drilling rigs are used for drilling and producing hydrocarbons from a well may be located at an offshore location. Such locations are often remote and require various types of transportation to transport personnel such as workers to and from the location. For example, transportation may include boats, helicopters, ships, busses, trucks, or other types of transportation. Workers may embark at one or more locations, then disembark at the remote location without any additional stopping points.

SUMMARY

Embodiments of the disclosure generally relate to the real-time location tracking of workers on a transportation vehicle using a wearable sensor and wireless stations. Embodiments of the disclosure further include automated embarkment using cameras and sensor readers.

In one embodiment, a system for real-time worker location tracking on a transportation vehicle is provided. The system includes a plurality of wireless stations each located at a different location on the transportation vehicle, the plurality of wireless stations operable to communicate over a low-power wireless network, and a wearable sensor wearable by a worker and operable to communicate over the low-power wireless network, such that the wearable sensor is configured to periodically communicate with the plurality of wireless stations. The wearable sensor includes a first processor, a first memory, a light source, and a photodetector, such that the light source and photodetector are configured for a photoplethysmography determination. The system further includes a server located on the transportation vehicle and operable to communicate over the wireless network. The server includes a second processor and a second memory having executable code stored thereon. The executable code includes a set of instructions that causes the second processor to perform operations that include monitoring the periodic communication between the wearable sensor and the plurality of wireless stations, detecting a lack of the periodic communication between the wearable sensor and the plurality of wireless stations within a time period, and initiating an alert in response to the detection, such that the alert indicates an absence of the worker from the transportation vehicle.

In some embodiments, the low-power wireless network uses Bluetooth Low Energy (BLE), Near Field Communication (NFC), radio-frequency identification (RFID), Low-Power Wi-fi, Zigbee, Matter, Z-wave, LoRa, or narrowband Internet of Things (IoT). In some embodiments, the transportation vehicle is a boat, ship, bus, or train. In some embodiments, initiating an alert in response to the detection includes activating an audible alarm of the transportation vehicle. In some embodiments, the system includes a camera on the transportation vehicle, such that the camera is orientated toward an embarkment location on the transportation vehicle and is configured to capture a face of the worker during embarkment. In some embodiments, the system includes a sensor reader configured to read the wearable sensor during embarkment of the worker. In some embodiments, the system includes a portable computing device having a camera, such that the portable computing device is operable to capture an image of an identification document of the worker during embankment using the camera.

In another embodiment, a method for tracking the real-time location of a worker on a transportation vehicle is provided. The method includes monitoring periodic communication between a wearable sensor and a plurality of wireless stations located on the transportation vehicle. The plurality of wireless stations are each located at a different location on the transportation vehicle and are operable to communicate over a low-power wireless network. Additionally, the wearable sensor is operable to communicate over the low-power wireless network. The method also includes determining a lack of the periodic communication between the wearable sensor and the plurality of wireless stations within a time period and initiating an alert in response to the determination, wherein the alert indicates an absence of the worker from the transportation vehicle.

In some embodiments, the low-power wireless network uses Bluetooth Low Energy (BLE), Near Field Communication (NFC), radio-frequency identification (RFID), Low-Power Wi-fi, Zigbee, Matter, Z-wave, LoRa, or narrowband Internet of Things (IoT). In some embodiments, the transportation vehicle is a boat, ship, bus, or train. In some embodiments, initiating an alert in response to the detection comprises activating an audible alarm of the transportation vehicle. In some embodiments, initiating an alert in response to the detection comprises providing an alert on a display in a control room or bridge of the transportation vehicle. In some embodiments, the method includes capturing, via a camera, an image of a face of the worker during embarkment. In some embodiments, the method includes reading, via a sensor reader, the wearable sensor during embarkment of the worker. In some embodiments, the method includes capturing, via a camera of a portable electronic device, an image of an identification document of the worker during embarkment.

In another embodiment, a non-transitory computer-readable storage medium having executable code stored thereon for tracking the real-time location of a worker on a transportation vehicle is provided. The executable code includes a set of instructions that causes a processor to perform operations that includes monitoring periodic communication between a wearable sensor and a plurality of wireless stations located on the transportation vehicle. The plurality of wireless stations are each located at a different location on the transportation vehicle and are operable to communicate over a low-power wireless network. Additionally, the wearable sensor is operable to communicate over the low-power wireless network. The method also includes determining a lack of the periodic communication between the wearable sensor and the plurality of wireless stations within a time period and initiating an alert in response to the determination, wherein the alert indicates an absence of the worker from the transportation vehicle.

In some embodiments, the low-power wireless network uses Bluetooth Low Energy (BLE), Near Field Communication (NFC), radio-frequency identification (RFID), Low-Power Wi-fi, Zigbee, Matter, Z-wave, LoRa, or narrowband Internet of Things (IoT). In some embodiments, the transportation vehicle is a boat, ship, bus, or train. In some embodiments, initiating an alert in response to the detection comprises activating an audible alarm of the transportation vehicle. In some embodiments, initiating an alert in response to the detection comprises providing an alert on a display in a control room or bridge of the transportation vehicle.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure are directed to systems, methods, and computer-readable media for real-time location tracking of workers on a transportation vehicle. By way of example, FIGS. 1 and 2 are schematic diagrams of a system 100 and vessel 102 depicting the real-time location tracking of offshore workers in accordance with an embodiment of the disclosure.

Figure 1:
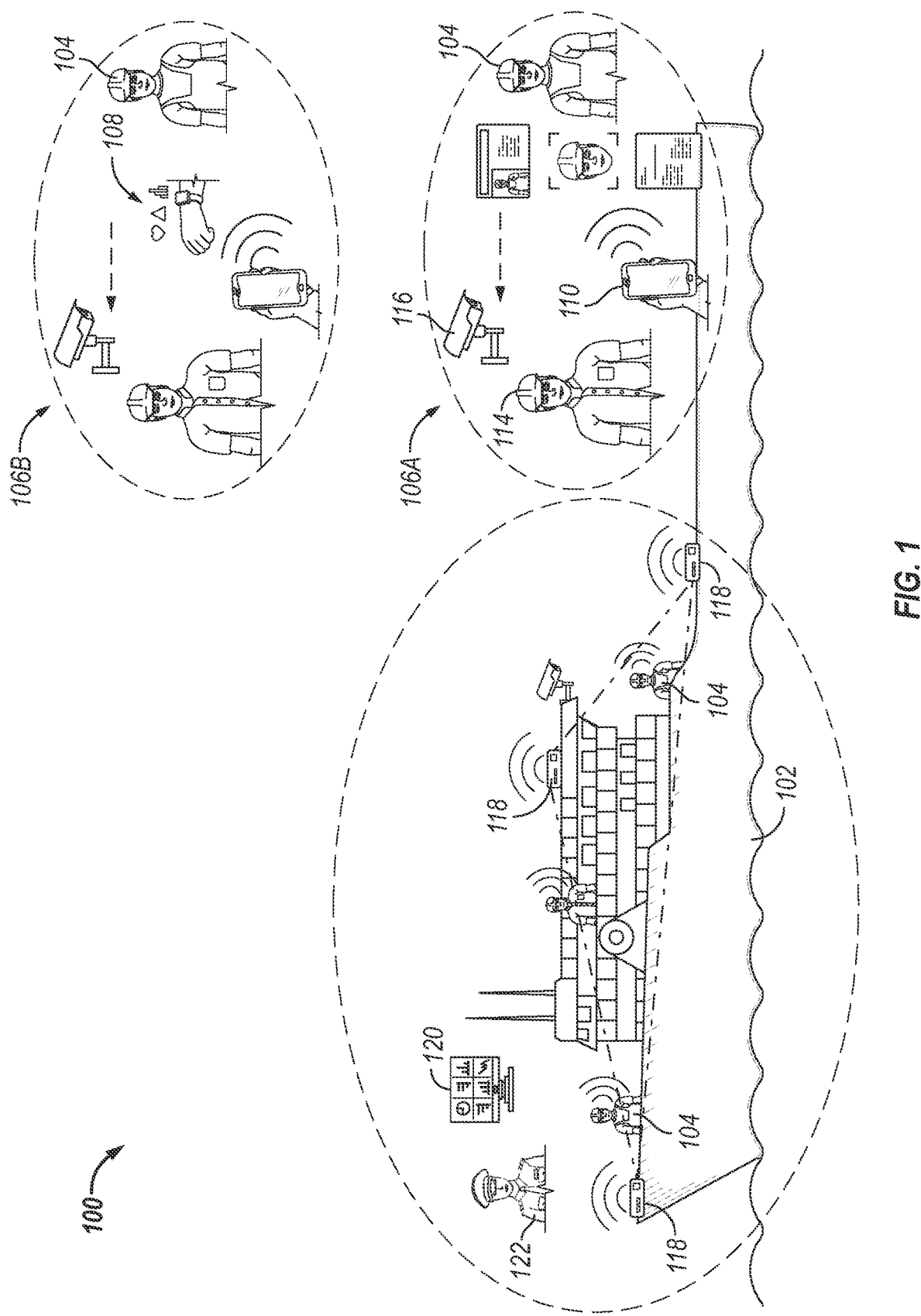
FIGS. 1 and 2 are schematic diagrams of a system and vessel depicting the real-time location tracking of offshore workers in accordance with an embodiment of the disclosure.

FIG. 1 depicts the system 100 and vessel 102 in an embarkment event, such that workers 104 may embark on the vessel 102. As also shown in FIG. 1, embodiments of the disclosure include an embarkation process 106 in which the workers 104 are identified for location tracking. The embarkation process 106 may include scanning of a wearable sensor 108 worn by the worker 104, identification documents 110 associated with the worker 104, or combination thereof, via a portable computing device (for example, smartphone 112). The scanning may be performed by vessel personnel 114. In some embodiments, the scanning may include cameras 116 performing facial recognition of the workers 104.

Figure 2:
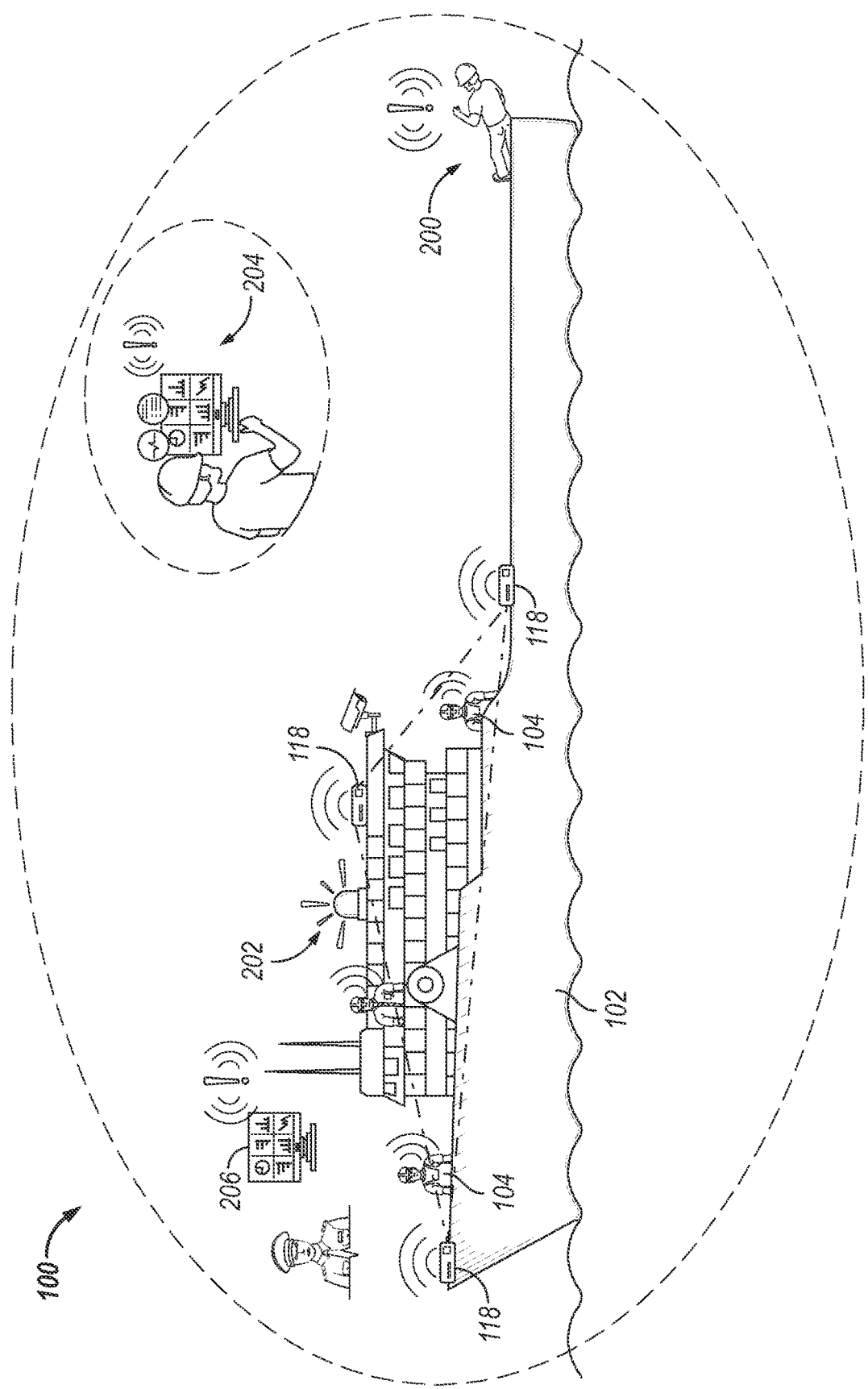

As shown in FIGS. 1 and 2 and as explained further supra, the vessel 102 may include multiple wireless stations 118 for tracking the workers 104. The wireless stations 118 may be located at various locations around the vessel 102 to detect the proximity of the wearable sensors 108 at these locations. In some embodiments, the worker identifications and embarkment data may be provided in a graphical user interface 120 provided on a computer of a control room of the vessel 102, such that a supervisor (for example, a captain 122) may view and monitor worker data and locations.

FIG. 2 depicts an unauthorized disembarkation event in accordance with an embodiment of the disclosure. In some instances, a worker 200 may unintentionally or impermissibly from the vessel 102 (for example, by falling overboard from a boat). In such scenarios, the wireless stations 118 may fail to detect the wearable sensor from the worker 200 over a specific time period. After failing this detection, the system 100 may determine the worker as missing and activate one or more alerts in response to the determination. For example, an alert 202 may be activated on the vessel 102. In some embodiments, an alert 204 may be activated on the graphical user interface 120 for alerting a supervisor (for example, the captain 122). In some embodiments, an alert 206 may be activated on a remote computer to alert remote personnel of the missing worker.

The disembarkation scenario may also use the wearable sensor 108. As shown in FIG. 1, the embarkation/disembarkation process 106B may include scanning of a wearable sensor 108 worn by the worker 104 via a portable computing device (for example, the smartphone 112). As the wearable sensor 108 is no longer on the vessel 102, the worker's location will no longer be tracked after disembarkation. In some embodiments, the disembarkation scanning may include cameras 116 performing facial recognition of the workers 104 leaving the vessel 102.

Figure 3:
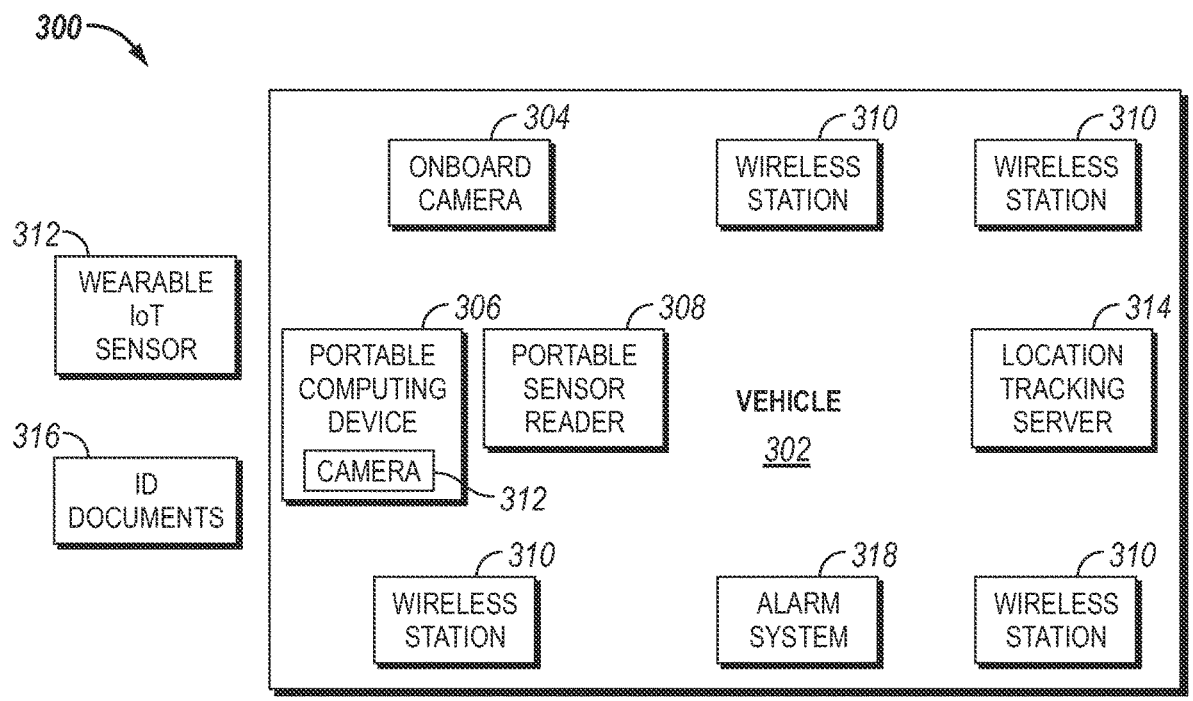
FIG. 3 is a block diagram of a system for the real-time location tracking of offshore workers in accordance with an embodiment of the disclosure.

FIG. 3 is a block diagram of a real-time worker location tracking system 300 in accordance with an embodiment of the disclosure. The system 300 is depicted with reference to a transportation vehicle 302, such as a boat, ship (as used herein, the term "vehicle "includes a vessel), bus, truck, or train. Moreover, the real-time worker location tracking system 300 may be used for tracking offshore workers or any other workers using transportation to a work destination.

The system 300 may include one or more onboard cameras 304, a portable computing device 306, a portable sensor reader 308, multiple wireless stations 310, and a wearable sensor 312 (which, in some embodiments, may be an Internet-of-Things (IoT) sensor). In some embodiments, the real-time worker location tracking system 300 includes a location tracking server 314 that may be located in a control room or other location of the transportation vehicle 302.

The one or more onboard cameras 304 may capture faces of workers during embarkment, disembarkation, or both, for facial recognition. The onboard cameras 304 may be located at the entrance point to the transportation vehicle 302, such as a door, so that images of workers entering the vehicle are captured by the camera.

The portable computing device 306 may include a camera 312 and may be used to scan identification documents 316. The portable computing device 306 may be, for example, a smartphone, a tablet, a laptop, or other suitable portable computing device. As described in the disclosure, personnel (for example, crew) onboard the transportation vehicle 302 may use the portable computing device 306 to scan the identification documents 316 associated with a worker and capture data about the worker during embarkment. For example, the identification documents 316 may include a driver's license, a passport, a national identification card, or other documents. In some embodiments, the scanning of the identification documents 316 may include optical character recognition of text on the one or more identification documents 316. In some embodiments, the optical character recognition is performed locally on the portable computing device 306. In other embodiments an image of the one or more identification documents 316 may be sent to the server 310, and the server 310 may perform include optical character recognition of text of the one or more identification documents 316.

As shown in FIG. 3, real-time worker location tracking system 300 may also include the portable sensor reader 308. The portable sensor reader 308 may include the capability to scan the wearable sensor 308 during embarkation and disembarkation of a worker. For example, the portable sensor reader 308 may include a radio frequency identification (RFID) scanner, a near field communication (NFC) scanner or other technology. In some embodiments, the portable computing device 306 may include the portable sensor reader 308, such that the portable computing device 306 and portable sensor reader 308 are a single device.

The wireless stations 310 may be distributed at various locations on the transportation vehicle 302 to ensure wireless coverage of all areas of the transportation vehicle 302 accessible by personnel. The wireless stations 310 may implement a suitable low power wireless technology. As used herein, the term "low power wireless" refers to technology that provides wireless communication using lower power than cellular, satellite, or Wi-Fi. In some embodiments, the wireless stations 310 may implement Bluetooth Low Energy (BLE), Near Field Communication (NFC), radio-frequency identification (RFID), Low-Power Wi-Fi, Zigbee, Matter, Z-wave, LoRa, or narrowband Internet of Things (IoT). The wireless stations 310 may be powered by directly from a power source (for example, a generator or alternator) of the transportation vehicle 302, by batteries located internally or externally of each wireless station 310, or by solar power (for example, solar power charging a battery or directly powering a wireless station 310). In some embodiments, the wireless stations 310 may be used to define a "safe zone" on the transportation vehicle 302, such that a worker leaving the safe zone may cause the initiation of an alert. The wireless stations 302 may be located in both exterior and interior areas of a transportation vehicle 302.

The wearable sensor 312 may have any suitable wearable housing. In some embodiments, the wearable sensor 312 may be a bracelet or a necklace (that is wearable on a lanyard). The wearable sensor 312 may include a processor, memory, and a battery (for example, rechargeable or replaceable batteries). As discussed in the disclosure, the wearable sensor 312 may implement any suitable low power wireless technology for communication with the portable sensor reader 308 and the multiple wireless stations 310. In some embodiments, the wearable sensor 312 may implement Bluetooth Low Energy (BLE), Near Field Communication (NFC), radio-frequency identification (RFID), Low-Power Wi-fi, Zigbee, Matter, Z-wave, LoRa, or narrowband Internet of Things (IoT).

The location tracking server 314 may be located in a control room or other location on the transportation vehicle 302 and may be in communication with (for example, receive data from and transmit data to) the wireless stations 310. In some embodiments, the location tracking server 314 may also be in communication with the onboard camera 304, the portable computing device 306, the portable sensor reader 308, or any combination thereof. In some embodiments, the location tracking server 314 may control an alarm system 318 on the transportation vehicle 302.

Advantageously, the real-time worker location tracking system 300 may be operated without access to the Internet (that is "offline") and with minimal power requirements due to the use of low power wireless technology. Moreover, the real-time worker location tracking system 300 is portable and may be used in different transportation vehicles with minimal (that is, "plug and play") installation efforts. Additionally, as the wearable sensors do not require a direct power source, this further reduces the requirements of the system 300.

Figure 4:
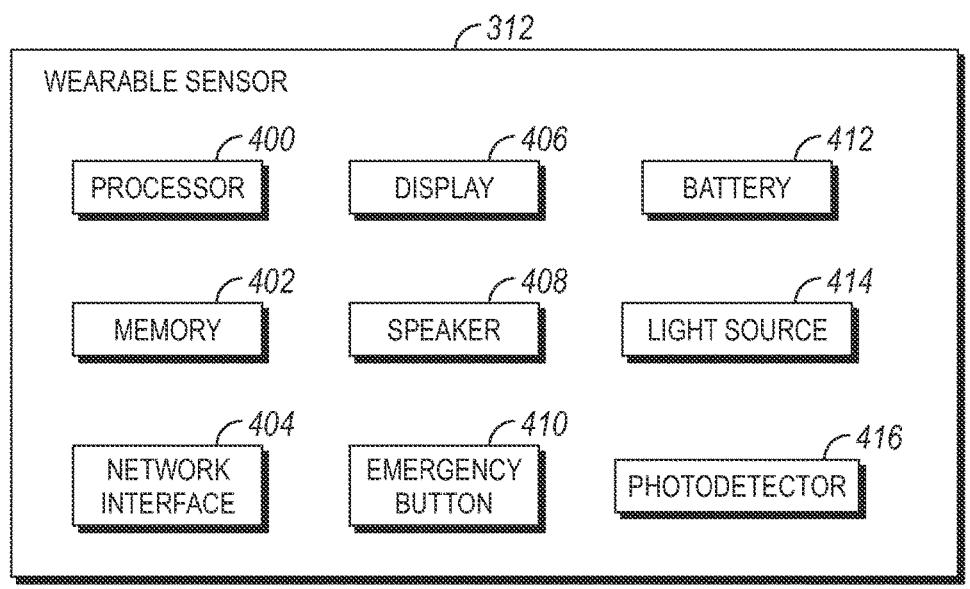
FIG. 4 is a block diagram of a wearable sensor of a system for the real-time location tracking of offshore workers in accordance with an embodiment of the disclosure.

FIG. 4 depicts the components of the wearable Internet-of-Things (IoT) sensor 312 in accordance with an embodiment of the disclosure. The wearable sensor 312 may include, for example, a processor 400, a memory 402, a wireless network interface 404, a display 406, a speaker 408, an emergency (for example, "SOS") button 410, and a battery 412. In some embodiments, the wearable sensor 312 may include a light source 414 and a photodetector 416 for photoplethysmography determinations.

The processor 400 (as used the disclosure, the term "processor" encompasses microprocessors) may include one or more processors having the capability to receive and process data, such as data stores in the memory 402. The processor 400 may execute instructions stored in the memory 400. In some embodiments, the processor 402 may include a reduced instruction set (RISC) processor. Additionally, the processor 402 may include a single-core processors and multicore processors and may include graphics processors. In some embodiments, the processor 400 and memory 402 may be implemented as a system-on-a-chip (SOC). In such embodiments, other components, such as the wireless network interface 404, may be implemented in the SOC.

The wireless network interface 404 may enable the wearable sensor 312 to communicate with the wireless stations 310 located on the vessel 102. In some embodiments, the network interface 404 may enable wireless communication using Bluetooth Low Energy (BLE), Near Field Communication (NFC), radio-frequency identification (RFID), Low-Power Wi-fi, Zigbee, Matter, Z-wave, LoRa, or narrowband Internet of Things (IoT).

The display 406 may be located on an external surface of the wearable sensor 312 and may provide status information about the sensor (for example, battery charge), alerts, and sensor outputs. For example, in some embodiments the display 406 may display a photoplethysmography determination (for example, oxygen saturation (SpO2) using the light source 414 and photodetector 416. The speaker 408 may output audio signals of the wearable sensor 312, such as alarms in response to an alert or other signals.

The emergency button 410 may initiate an emergency signal from the wearable sensor 312 when selected. The emergency signal may be transmitted to the wireless station 310 via the wireless network interface 404 and to the location tracking server 314. Upon receiving the emergency signal, the location tracking server 314 may activate an alarm (such as via the alarm system 318) and send alerts to certain personnel indicating that an emergency associated with the particular wearable sensor 312 has been activated. In this manner, a worker may request assistance in the event of an emergency by selecting the emergency button 410 on the wearable sensor 312.

The battery 412 may power the wearable sensor 312 and the components thereof. The battery 412 may be charged by wired charging, wireless charging, or both. In some embodiments the battery 412 may be rechargeable or replaceable.

The light source 414 and photodetector 416 may be used for photoplethysmography determinations (such as oxygen saturation (SpO2) and heart rate) using techniques known the in the art. The light source 414 may include one or more light emitting diodes (LEDs) or other suitable light sources. The photodetector 416 may include one or more photodetectors for detecting light emitted from the light source that is reflected or transmitted after contact with tissue, blood, and other components of a human body.

In some embodiments, the wearable sensor 312 may include other features. For example, in some embodiments the wearable sensor 312 may include a flashlight (for example, an LED) for illuminating larger external areas (as opposed to the light source 414 used for photoplethysmography determinations). In some embodiments, the wearable sensor 312 may include solar panels for recharging the battery 412.

Figure 5:
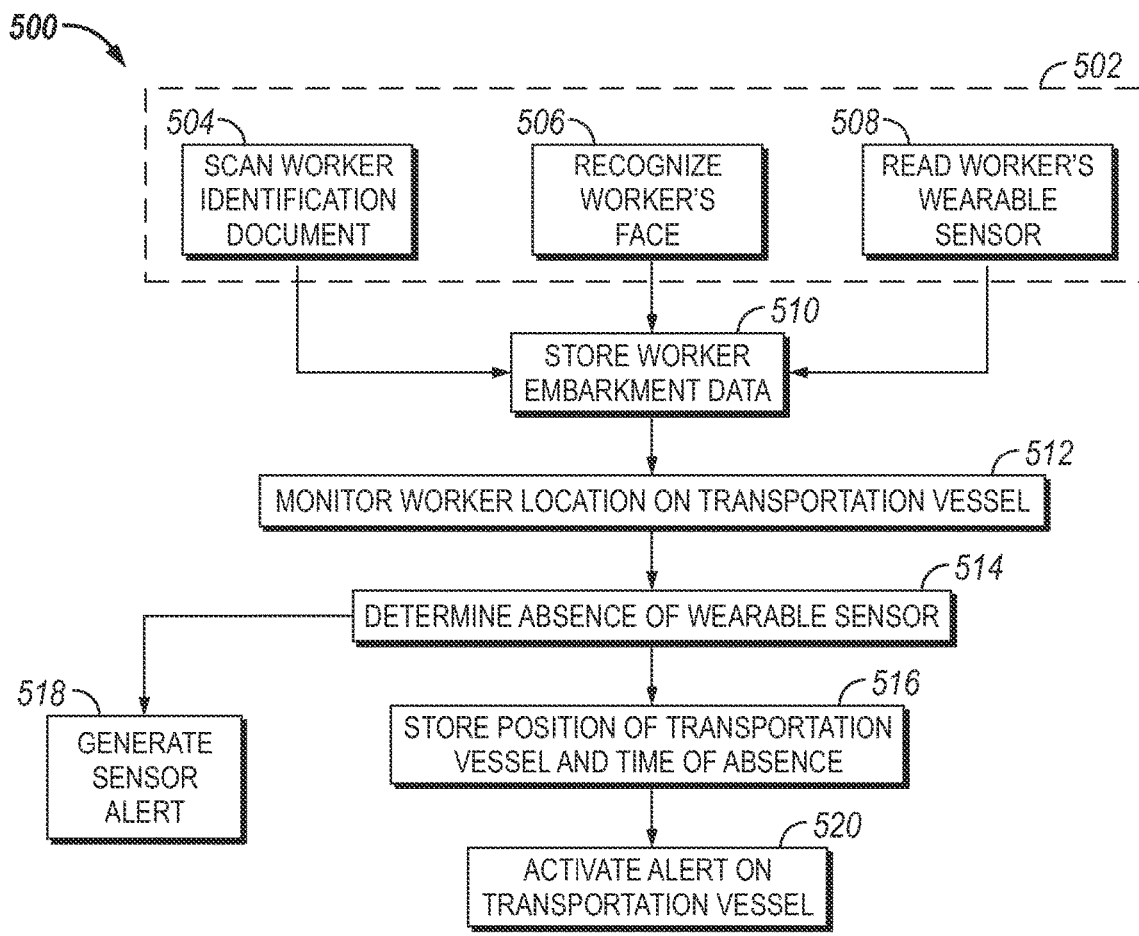
FIG. 5 is a flowchart of a process for the real-time location tracking of workers in accordance with an embodiment of the disclosure.

FIG. 5 depicts a process 500 for real-time tracking of a worker's location in accordance with an embodiment of the disclosure. The first portion of the process 500 may include the embarkment (block 502) for a worker. The embarkment (block 502) may include scanning a worker's identification document (block 504), recognizing a worker's face (block 506) (that is, facial recognition), or reading a worker's wearable sensor (block 508). As discussed supra, the identification document may include a driver's license, a passport, a national identification card, or other documents, and may be scanned using optical character recognition of text the identification documents. The worker's face may be captured and recognized (block 504) using cameras located at embarkment area of the transportation vehicle. As also discussed supra, in some embodiments a wearable sensor worn by a worker may be scanned (block 508) using a scanner device (for example, a portable sensor reader).

Next, as shown in FIG. 5, the worker's data may be store (block 510). This may include associating all of the data obtained during embarkment with a unique identifier for the worker. For example, the data obtained from an identification document via optical character recognition may be associated with a unique identifier for the worker and stored. Similarly, facial recognition data (for example, a digital image of a worker's face) may be associated with the unique identifier and stored. Additionally, sensor data (such as time, location, sensor identifier) of the sensor reading may be associated with the unique identifier for the worker and stored. The storing may include transmitting the data to a server for storage on a data storage device of or accessible by the server. In some embodiments, a database or other organized collection of data may be used to store the data.

The worker's location on the transportation vehicle may then be monitored (block 512). The monitoring may include determining communication between the worker's wearable sensor and wireless stations on the transportation vehicle. For example, in some embodiments the monitoring may be performed by periodically determining whether a wearable sensor has communicated one or more wireless stations. This determination may be based on communications received from the wireless stations by a server or polling of the wireless stations by the server. The location of the wireless station having the most recent communication of a worker's wearable sensor may be determined to be the most recent location of the worker. In some embodiments, the monitoring may also include obtaining photoplethysmography determinations (for example, heart rate) from a wearable sensor. The photoplethysmography determinations may be compared to a threshold to determine the health status of the worker.

During the monitoring, the absence of a particular wearable sensor may be determined (block 514). Determining the absence of a wearable sensor may include a determination that the no communication between the wearable sensor and any wireless stations of the transportation vehicle have occurred within a specific time period, as this may indicate the worker wearing the sensor is no longer within range of the wireless stations (and may thus no longer be on the transportation vehicle).

As shown in FIG. 5, in response to the determination of the absent wearable sensor, the current position of the transportation vehicle and the current time may be associated with a unique identifier for the worker and stored (block 516). In some embodiments, the current position of the transportation vehicle may be determined using a satellite-based radio navigation system (such as the Global Positioning System (GPS) or GLONASS). The current position of the transportation vehicle and the current time may provide useful data for determining the current location and status of the absent worker (for example, the approximate location of an overboard worker). In some embodiments, the wearable sensor may include a receiver for a satellite-based radio navigation system and the last-known location of the sensor may be used.

In some embodiments, in response to the absence of a particular wearable sensor, an alert may be generated on the wearable sensor (block 518). In such embodiments, the alert may be generated on the wearable sensor in response to an absence determination performed locally on the wearable sensor. For example, if the wearable sensor is unable to communicate with any wireless station within a specific time period, the wearable sensor may activate a local alert. The alert may include a visual alarm on a display of the wearable sensor, an audible alarm on a speaker of the wireless sensor, or a combination thereof.

Additionally, as shown in FIG. 5, an alert may be activated on the transportation vehicle (block 520). The alert may be activated by a server displaying or sending data. For example, as discussed supra, an alert may be activated on a graphical user interface in a control room or a bridge of the transportation vehicle to alert a supervisor (for example, a captain). In some embodiments, the alert may be activated on personal computing devices (for example, cell phones) of crew member of the transportation vehicle. In some embodiments, activating the alert may include activating an alarm system on the transportation vehicle, such that an audible alarm (for example, a siren) is broadcast throughout the vehicle. This may enable, for example, the initiation of a rescue operation for an overboard worker.

Figure 6:
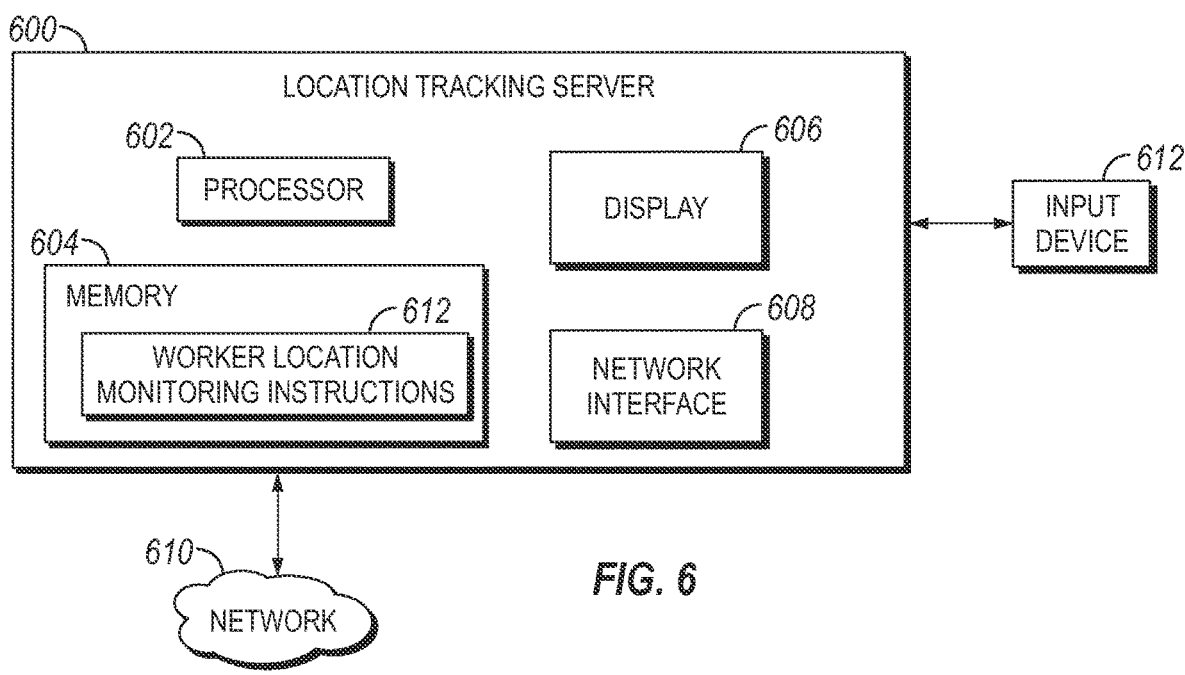
FIG. 6 is a block diagram of a location tracking server in accordance with an embodiment of the disclosure.

FIG. 6 depicts components of an example location tracking server 600 in accordance with an embodiment of the disclosure. As shown in FIG. 6, the example location tracking server 600 may include a processor 602, a memory 604, a display 606, and a network interface 608 that may be in communication with a low power network 610. It should be appreciated that the example location tracking server 600 may include other components that are omitted for clarity. In some embodiments, the example location tracking server 600 may include or be a virtual server, a desktop computer, a laptop computer, a tablet computer, or the like.

The processor 602 (as used the disclosure, the term "processor" encompasses microprocessors) may include one or more processors having the capability to receive and process hydrocarbon resources data, such as the data described in the disclosure. N some embodiments, the processor 602 may include an application-specific integrated circuit (ASIC). In some embodiments, the processor 602 may include a reduced instruction set (RISC) processor. Additionally, the processor 602 may include a single-core processors and multicore processors and may include graphics processors. Multiple processors may be employed to provide for parallel or sequential execution of one or more of the techniques described in the disclosure. The processor 602 may receive instructions and data from a memory (for example, memory 604).

The memory 604 (which may include one or more non-transitory computer readable storage mediums) may include volatile memory, such as random access memory (RAM), and non-volatile memory, such as ROM, flash memory, a hard drive, any other suitable optical, magnetic, or solid-state storage medium, or a combination thereof. The memory 604 may be accessible by the processor 602. The memory 604 may store executable computer code. The executable computer code may include computer program instructions for implementing one or more techniques described in the disclosure. For example, the executable computer code may include worker location monitoring instructions 612 to implement embodiments of the present disclosure. In some embodiments, the worker location monitoring instructions 612 may implement one or more elements of process 500 described supra and illustrated in FIG. 5.

The display 606 may include a cathode ray tube (CRT) display, liquid crystal display (LCD), an organic light emitting diode (OLED) display, or other suitable display. The display 606 may display a user interface (for example, a graphical user interface) that may display information received from the example location tracking server 600. In accordance with some embodiments, the display 606 may be a touch screen and may include or be provided with touch sensitive elements through which a user may interact with the user interface. In some embodiments, the display 606 may display alerts generated according to the worker location monitoring instructions 612.

The network interface 608 may provide for communication between the example location tracking server 600 and other devices and systems via the network 610. The network interface 608 may include a wired network interface card (NIC), a wireless (for example, radio frequency) network interface card, or combination thereof. The network interface 608 may include circuitry for receiving and sending signals to and from communications networks, such as an antenna system, an RF transceiver, an amplifier, a tuner, an oscillator, a digital signal processor, and so forth. In some embodiments, the network interface 404 may enable wireless communication using Bluetooth Low Energy (BLE), Near Field Communication (NFC), radio-frequency identification (RFID), Low-Power Wi-fi, Zigbee, Matter, Z-wave, LoRa, or narrowband Internet of Things (IoT). In some embodiments, the network interface 404 may also enable communication using other technologies, such as Ethernet or Wireless Fidelity (Wi-Fi) (for example, IEEE 802.11 standards).

In some embodiments, the example location server 600 may include or be coupled to an input device 616 (for example, one or more input devices). The input devices 616 may include, for example, a 616, a mouse, a microphone, or other input devices. In some embodiments, the input device 616 may enable interaction with a user interface (for example, a graphical user interface) displayed on the display 606.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A system for real-time worker location tracking on a transportation vehicle, comprising:
 a plurality of wireless stations each located at a different location on the transportation vehicle, the plurality of wireless stations operable to communicate over a low-power wireless network;
 a wearable sensor wearable by a worker and operable to communicate over the low-power wireless network, wherein the wearable sensor is configured to periodically communicate with the plurality of wireless stations, the wearable sensor comprising:
  a first processor;
  a first memory:
  a light source; and
  a photodetector, wherein the light source and photodetector are configured for a photoplethysmography determination; and
 a server located on the transportation vehicle and operable to communicate over the wireless network, wherein the server comprises a second processor and a second memory having executable code stored thereon, the executable code comprising a set of instructions that causes the second processor to perform operations comprising:
  monitoring the periodic communication between the wearable sensor and the plurality of wireless stations;
  detecting a lack of the periodic communication between the wearable sensor and the plurality of wireless stations within a time period; and
  initiating an alert in response to the detection, wherein the alert indicates an absence of the worker from the transportation vehicle.

2. The system of claim 1, wherein the low-power wireless network uses Bluetooth Low Energy (BLE), Near Field Communication (NFC), radio-frequency identification (RFID), Low-Power Wi-fi, Zigbee, Matter, Z-wave, LoRa, or narrowband Internet of Things (IoT).

3. The system of claim 1, wherein the transportation vehicle comprises a boat, ship, bus, or train.

4. The system of claim 1, wherein initiating an alert in response to the detection comprises activating an audible alarm of the transportation vehicle.

5. The system of claim 1, wherein initiating an alert in response to the detection comprises providing an alert on a display in a control room or bridge of the transportation vehicle.

6. The system of claim 1, comprising a camera on the transportation vehicle, wherein the camera is orientated toward an embarkment location on the transportation vehicle and is configured to capture a face of the worker during embarkment.

7. The system of claim 1, comprising a sensor reader configured to read the wearable sensor during embarkment of the worker.

8. The system of claim 1, comprising a portable computing device comprising a camera, wherein the portable computing device is operable to capture an image of an identification document of the worker during embankment using the camera.

9. A method for tracking the real-time location of a worker on a transportation vehicle, comprising:

monitoring periodic communication between a wearable sensor and a plurality of wireless stations located on the transportation vehicle, wherein the plurality of wireless stations are each located at a different location on the transportation vehicle and are operable to communicate over a low-power wireless network, wherein the wearable sensor is operable to communicate over the low-power wireless network;

determining a lack of the periodic communication between the wearable sensor and the plurality of wireless stations within a time period; and initiating an alert in response to the determination, wherein the alert indicates an absence of the worker from the transportation vehicle.

10. The method of claim 9, wherein the low-power wireless network uses Bluetooth Low Energy (BLE), Near Field Communication (NFC), radio-frequency identification (RFID), Low-Power Wi-fi, Zigbee, Matter, Z-wave, LoRa, or narrowband Internet of Things (IoT).

11. The method of claim 9, wherein the transportation vehicle comprises a boat, ship, bus, or train.

12. The method of claim 9, wherein initiating an alert in response to the detection comprises activating an audible alarm of the transportation vehicle.

13. The method of claim 9, wherein initiating an alert in response to the detection comprises providing an alert on a display in a control room or bridge of the transportation vehicle.

14. The method of claim 9, comprising capturing, via a camera, an image of a face of the worker during embarkment.

15. The method of claim 9, comprising reading, via a sensor reader, the wearable sensor during embarkment of the worker.

16. The method of claim 9, comprising capturing, via a camera of a portable electronic device, an image of an identification document of the worker during embarkment.

17. A non-transitory computer-readable storage medium having executable code stored thereon for tracking the real-time location of a worker on a transportation vehicle, the executable code comprising a set of instructions that causes a processor to perform operations comprising:

monitoring periodic communication between a wearable sensor and a plurality of wireless stations located on the transportation vehicle wherein the plurality of wireless stations are each located at a different location on the transportation vehicle and are operable to communicate over a low-power wireless network, wherein the wearable sensor is operable to communicate over the low-power wireless network;

determining a lack of the periodic communication between the wearable sensor and the plurality of wireless stations within a time period; and initiating an alert in response to the determination, wherein the alert indicates an absence of the worker from the transportation vehicle.

18. The non-transitory computer-readable storage medium of claim 17, wherein the low-power wireless network uses Bluetooth Low Energy (BLE), Near Field Communication (NFC), radio-frequency identification (RFID), Low-Power Wi-fi, Zigbee, Matter, Z-wave, LoRa, or narrowband Internet of Things (IoT).

19. The non-transitory computer-readable storage medium of claim 17, wherein initiating an alert in response to the detection comprises activating an audible alarm of the transportation vehicle.

20. The non-transitory computer-readable storage medium of claim 17, wherein initiating an alert in response to the detection comprises providing an alert on a display in a control room or bridge of the transportation vehicle.

* * * * *